United States Patent
Mukherjee et al.

(10) Patent No.: US 6,831,648 B2
(45) Date of Patent: Dec. 14, 2004

(54) SYNCHRONIZED IMAGE DISPLAY AND BUFFER SWAPPING IN A MULTIPLE DISPLAY ENVIRONMENT

(75) Inventors: Shrijeet Mukherjee, Mountain View, CA (US); Kanoj Sarcar, Mountain View, CA (US); James Tornes, Menlo Park, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 139 days.

(21) Appl. No.: 09/993,925

(22) Filed: Nov. 27, 2001

(65) Prior Publication Data

US 2002/0118201 A1 Aug. 29, 2002

Related U.S. Application Data

(60) Provisional application No. 60/252,887, filed on Nov. 27, 2000.

(51) Int. Cl.[7] .............................................. G06F 15/16
(52) U.S. Cl. ........................ 345/504; 345/502; 345/505; 712/31
(58) Field of Search ................................ 345/502, 503, 345/504, 505, 506; 712/10, 11, 16, 19, 31; 709/208

(56) References Cited

U.S. PATENT DOCUMENTS

| | | | | |
|---|---|---|---|---|
| 5,195,186 A | * | 3/1993 | Trevitt et al. ............... | 710/110 |
| 5,410,542 A | * | 4/1995 | Gerbehy et al. ............ | 370/364 |
| 5,530,846 A | * | 6/1996 | Strong ........................ | 713/400 |
| 5,657,478 A | | 8/1997 | Recker et al. .............. | 395/503 |
| 5,878,216 A | * | 3/1999 | Young et al. ............... | 709/208 |
| 6,046,709 A | | 4/2000 | Shelton et al. ................. | 345/1 |
| 6,157,395 A | | 12/2000 | Alcorn ....................... | 345/506 |
| 6,172,528 B1 | * | 1/2001 | Malarsie ...................... | 326/86 |
| 6,542,754 B1 | | 4/2003 | Sayers et al. ............... | 455/502 |

OTHER PUBLICATIONS

Bierbaum, A. et al., "Flexible Application Design Using VR Juggler," *SIGGRAPH 2000*, New Orleans, Jul. 2000, 1 page.
Bierbaum, A. and Just, C., "Software Tools for Virtual Reality Application Development," *SIGGRAPH '98*, Applied Virtual Reality (Course 14), Orlando, Florida, Jul. 1998, pp. 3–2 to 3–45.
Just, C. et al., "VR Juggler: A Framework for Virtual Reality Development," *Immersive Projection Technology Workshop (IPT98)*, Ames, Iowa, May 1998, pp. 1–8.

* cited by examiner

*Primary Examiner*—Matthew C. Bella
*Assistant Examiner*—Mackly Monestime
(74) *Attorney, Agent, or Firm*—Sterne, Kessler, Goldstein & Fox, P.L.L.C.

(57) ABSTRACT

A system and method for synchronizing image display and buffer swapping in a multiple processor-multiple display environment. In a master-slave dichotomy, one processor or system is deemed the master and the others act as slaves. The master generates signals used to control vertical retrace and buffer swapping for itself and the slaves. In addition, a synchronization signal generator is provided to synchronize a timing signal between the master and slave systems.

18 Claims, 7 Drawing Sheets

SYNCHRONIZED IMAGE DISPLAY AND BUFFER SWAPPING IN A MULTIPLE DISPLAY ENVIRONMENT

CROSS-REFERENCE TO RELATED APPLICATIONS

This application claims priority to U.S. Provisional Application No. 60/252,887, entitled "Synchronized Image Display and Buffer Swapping in a Multiple Display Environment," filed Nov. 27, 2000, by Mukherjee et al., (incorporated by reference in its entirety herein).

This application is related to the following non-provisional applications, all having the same filing date as the present application:

"Synchronization of Vertical Retrace For Multiple Participating Graphics Computers," U.S. patent application Ser. No. TBD, by Mukherjee et al., filed concurrently herewith and incorporated by reference herein in its entirety; and "Swap Buffer Synchronization in a Distributed Rendering System," U.S. patent application Ser. No. TBD, by Mukherjee et al., filed concurrently herewith and incorporated by reference herein in its entirety.

STATEMENT REGARDING FEDERALLY-SPONSORED RESEARCH AND DEVELOPMENT

Not applicable.

BACKGROUND OF THE INVENTION

1. Field of the Invention

The present invention relates generally to computer graphics and, more particularly to synchronized rendering and display of images across multiple display devices.

2. Background Art

Obtaining visual realism is crucial in computer graphics systems. To this end, it is often necessary to produce multiple levels of images on a single display device (e.g., a CRT, LCD, active matrix or plasma display). In the alternative, some graphics systems seek to achieve visual reality by generating a large visual image across multiple display devices. Flight simulation applications are an example where multiple display devices are used. Each display contributes to the overall image by providing either a front, left, or right view of the scene. As the simulated flight progresses, each of the front, left, and right views change. Proper synchronization between the various display devices is key to maintaining the reality of the scene being presented.

Load balancing is another application that requires synchronization. Parts of a scene are separately generated and then blended together.

Synchronization is made difficult, however, by the varying complexities of the images being presented on the various displays. As a result, many graphics systems will become desynchronized and produce visual artifacts or distortions in the resulting image. Previous attempts to prevent the occurrence of these distortions have been directed to hardware solutions at the graphics pipeline level. However, these solutions are expensive to implement.

What is needed is a solution that will work with off-the-shelf (i.e., commercially available) hardware.

BRIEF SUMMARY OF THE INVENTION

The present invention provides a graphics system and method for performing synchronized image display and swap buffering in a multiple display/multiple processor environment. Synchronization is achieved through a master-slave dichotomy.

The graphics system has a master system and a plurality of slave systems. Each slave system contributes to the generation of a common scene. One or more processors are included within each slave system. One processor is made responsible for controlling the functions of each slave system with respect to synchronization. Each slave system also has I/O ports to provide communications between it and the master system. A plurality of daughter cards are included within each slave system. Each daughter card is an integrated circuit board used for timing synchronization between the slave systems and the master system.

The slave systems further include a plurality of graphics processors (i.e., graphics accelerators or coprocessors). Finally, each slave system has a device driver. The device driver is responsible for receiving and processing commands to the graphics processors. In addition, the device driver performs time synchronization with the master system and executes commands transmitted from the master.

The master system synchronizes the rendering and display functions of the slave systems. Like the slave systems, the master system also includes one or more processors and I/O ports. In addition, the master system has a synchronization signal generator. The synchronization signal generator is used to provide a timing signal to each daughter card located within the slave systems.

The graphics system further includes a multidrop cable. The multidrop cable provides communications between the slave systems and the master system. The multidrop cable is designed such that any transmission communicated over it will arrive at the I/O ports of the slave systems at approximately the same time. In further embodiments, communications between the slave systems and the master system is provided using a daisy chain wiring scheme.

The present invention addresses synchronization of vertical retrace and buffer swapping. In one embodiment, synchronization of image display and vertical retrace is achieved through transmission of a clock signal generated by the synchronization signal generator in the master system and provided in a daisy chain manner to the daughter cards located within the slave systems.

In another embodiment, synchronization of vertical retrace is achieved through a clocking means available through performance counters or processor clocks. In still another embodiment, synchronization is used to manage buffer swapping among the multiple processors so that rendering is synchronized.

BRIEF DESCRIPTION OF THE DRAWINGS/FIGURES

The accompanying drawings illustrate the present invention and together with the description, further serve to explain the principles of the invention and to enable a person skilled in the relevant art to make and use the invention. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention provides a system, method and computer program product for synchronizing image display and buffer swapping in a multiple display environment.

I. System Embodiments

Figure 1:
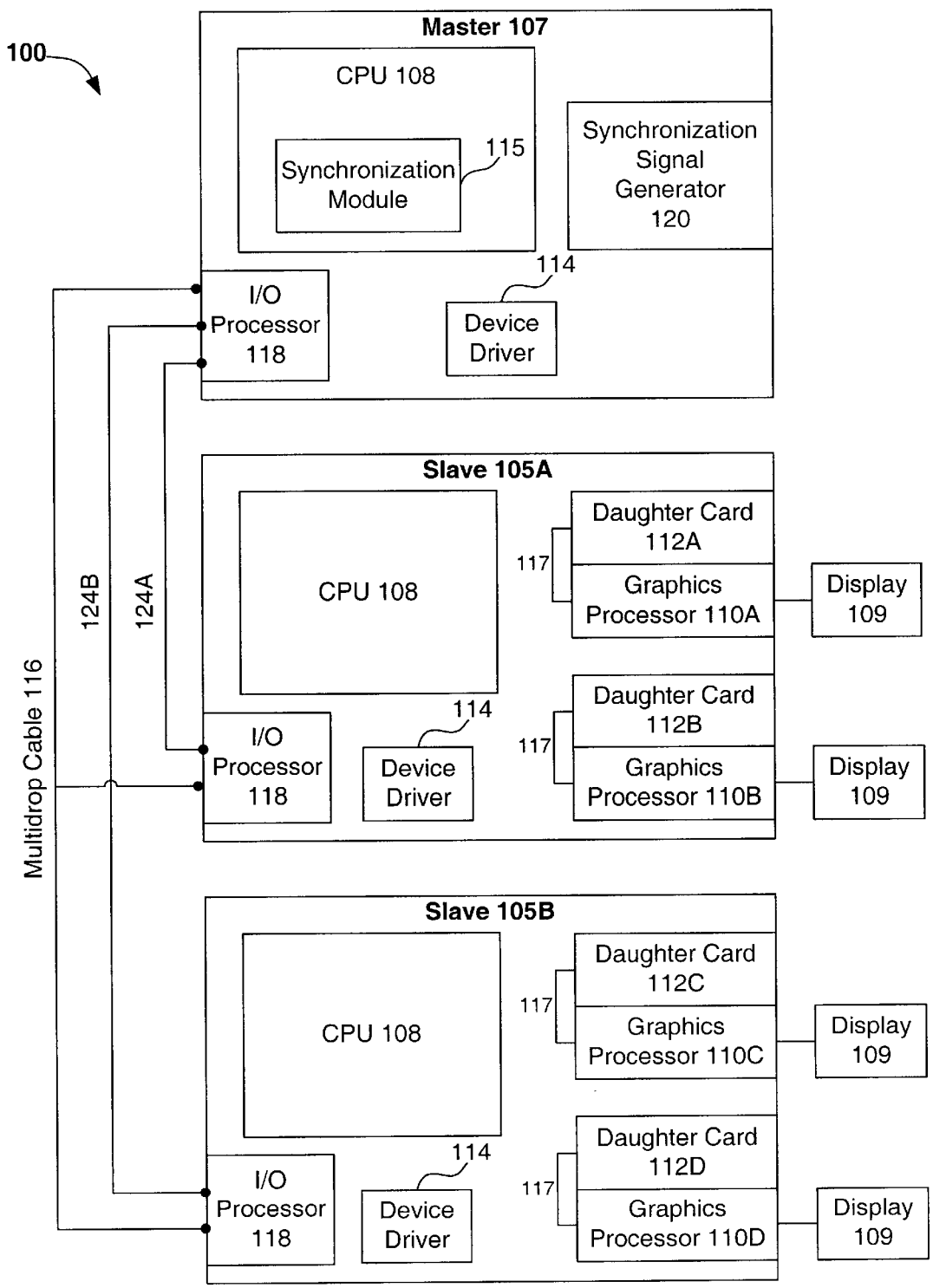
FIG. 1 is a diagram of a computer system according to an embodiment of the present invention.

FIG. 1 is a diagram of a graphics system according to an embodiment of the present invention. The graphics system 100 has a master system 107 and a plurality of slave systems 105A and 105B. Each slave system 105 contributes to the generation of a common scene in displays 109.

Each slave system 105 has a processor 108. Processor 108 is responsible for controlling the functions of each slave system 105. Each slave system 105 also has I/O ports 118 to provide communications between it and master system 107. I/O ports 118 can be any interface supporting broadcast and point to point communications such as, serial ports, parallel ports, firewire, or SCSI, for example.

A timing signal provider for propagating a time synchronization signal is also included within each slave system 105. In one embodiment, the timing signal provider is implemented using a plurality of daughter cards 112. Each daughter card 112 is an integrated circuit board used for providing external clock synchronization between the slave systems 105 and master system 107. In the case where multiple daughter cards 112 are used within an individual slave system 105, then the daughter cards 112 can be connected to one another in a daisy chain. In this way, each daughter card acts as a repeater and provides signal amplification of an external clock signal generated in a master system.

In an alternative embodiment, the timing signal provider is implemented using a fanout box having signal amplifiers. The external synchronization signal is then provided to the fanout box which in turn provides the signal directly to each graphics processor. After reading this disclosure, one skilled in the relevant arts will recognize other implementation arrangements for propagating the time synchronization signal without departing from the scope of the present invention.

Slave system 105A and slave system 105B further include a plurality of graphics processors (i.e. graphics accelerators or coprocessors) 110. Graphics processors 110 may be any known graphics processor such as the GeForce2 graphics processing unit available from Nvidia Corporation, Santa Clara, Calif., for example. A connector 117, is provided to connect each daughter card 112 to a graphics processor 110. Connector 117 is an internal wire or cable able to transmit an electrical signal between the internal hardware. Finally, each slave system 105 has a device driver 114. Device driver 114 is responsible for executing commands from master system 107 and providing processing commands to graphics processors 110.

Master system 107 is used to synchronize the rendering and display functions of slave systems 105A and 105B. Master system 107 includes a processor 108, I/O ports 118, Device driver 114, and a synchronization signal generator 120. Master system I/O ports 118 exchange communications with the I/O ports 118 of each slave system 105 using respective communications cables 124. Synchronization signal generator 120 is used to provide a pulse stream signal 122 to each daughter card 112. Synchronization signal generator 120 can provide any signal from which timing information can be extracted. In one embodiment, synchronization signal generator 120 provides a clock signal. In an alternative embodiment, synchronization signal generator provides a video signal.

Video signals have timing signals embedded within them. Upon receiving the video signal, daughter cards 112 can extract the timing signal and pass it on to the graphics processors 110. This timing signal would be used to provide clock synchronization between the master system 107 and the slave systems 105A and 105B.

Master system 107 further includes a synchronization module 115. Synchronization module 115 contains control logic that manages the synchronization of vertical retrace and frame buffer swapping between the slave systems 105A and 105B.

Graphics system 100 also includes a communications link. In one embodiment, the communications link is implemented using a multidrop cable 116. Multidrop cable 116 provides communications between slave systems 105A and 105B and master system 107. Multidrop cable 116 could be, for example, a multi-connection coaxial cable. In accordance with this embodiment, multidrop cable 116 is designed such that any transmission communicated over it will arrive at the I/O ports 118 of slave system 105A and slave system 105B at approximately the same time.

In an alternative embodiment, the communications link is implemented using a daisy chain wiring scheme. This alternative is useful when the slave systems and master system are close enough for transmissions to be propagated to each node within an acceptable time frame. For example, within 10 microseconds.

Each of the slave systems 105 and master system 107 can be any computer system or systems, for example, a personal computer, workstation or mainframe. While graphics system 100 has been described as having three separate computer systems, this is intended by way of example only and not limitation.

In an alternative embodiment, slave systems 105 and master system 107 could be implemented into a single computer system having one or more processors 108. In this case, communications between the slave systems 105 and the master system 107 would rely upon inter-processor buses instead of a multidrop cable to provide broadcast communications. Furthermore, serial communications would be replaced with point to point communications. After reading this disclosure, one skilled in the relevant arts will recognize other implementation arrangements without departing from the scope of the present invention.

Figure 2:
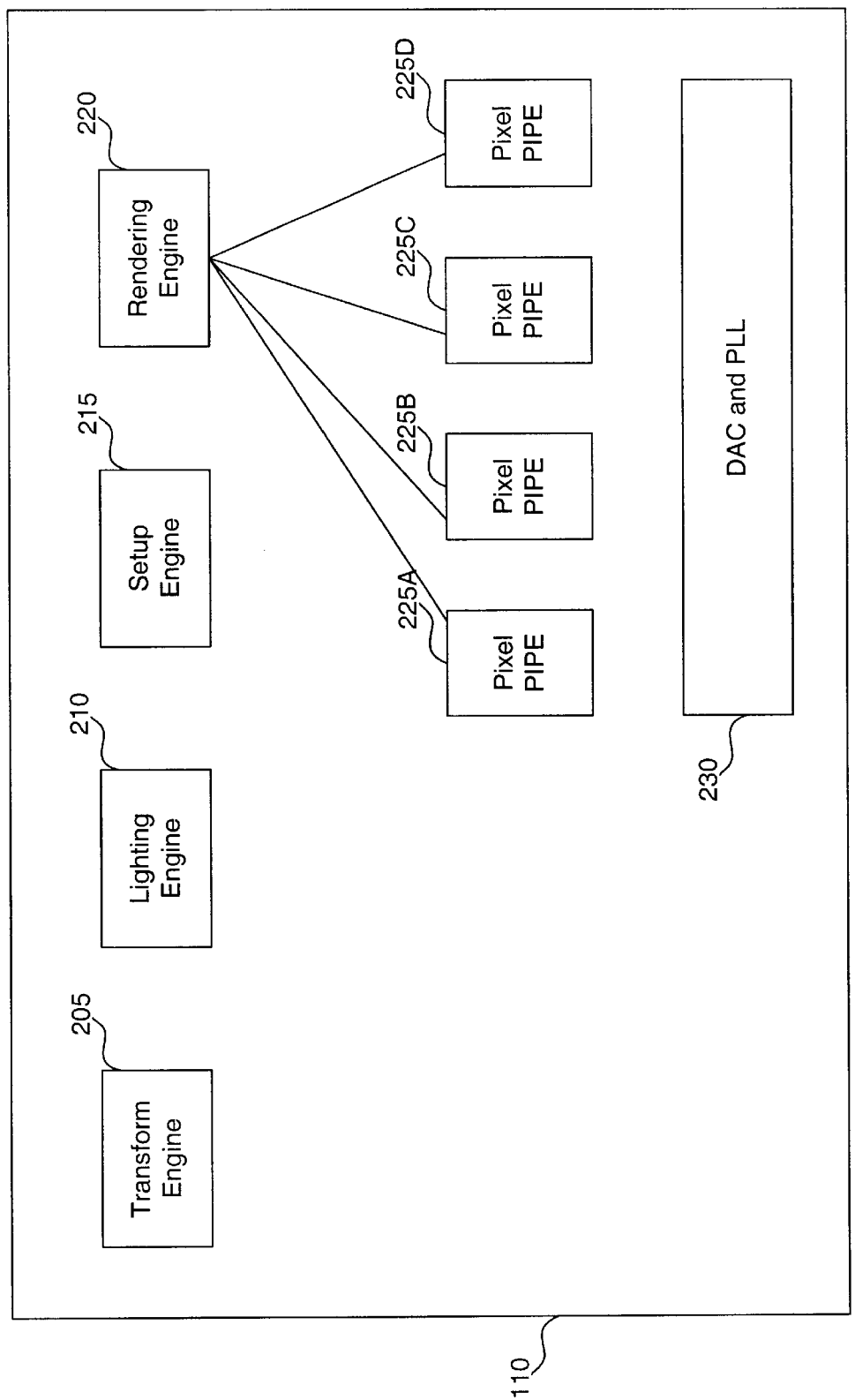
FIG. 2 is a diagram of an example graphics architecture in an implementation of the present invention.

FIG. 2 illustrates the graphics architecture of an Nvidia chip used for graphics processor 110 according to an implementation of the present invention. Graphics processor 110 includes a Transform Engine 205, a Lighting Engine 220 is further associated with a plurality of pixel pipes 225, designated Pixel Pipe 225A, Pixel Pipe 225B, Pixel Pipe 225C, and Pixel Pipe 225D.

Graphics processor 110 also includes a Digital Analog Converter (DAC) 230 and a crystal oscillator (not shown). The DAC 230 is used to generate the video signals shown in the common scene on displays 109. The architecture and operation of graphics processor 110 would be apparent to one skilled in the relevant art and thus further description is not provided.

II. Synchronized Image Display

As previously discussed, it is important that the images generated by slave systems 105 and displayed on displays 109 be synchronized with respect to time and position. A method for synchronizing vertical retrace between the slave systems 105 is now described with reference to FIG. 1 and the steps illustrated in FIG. 3.

Figure 3:
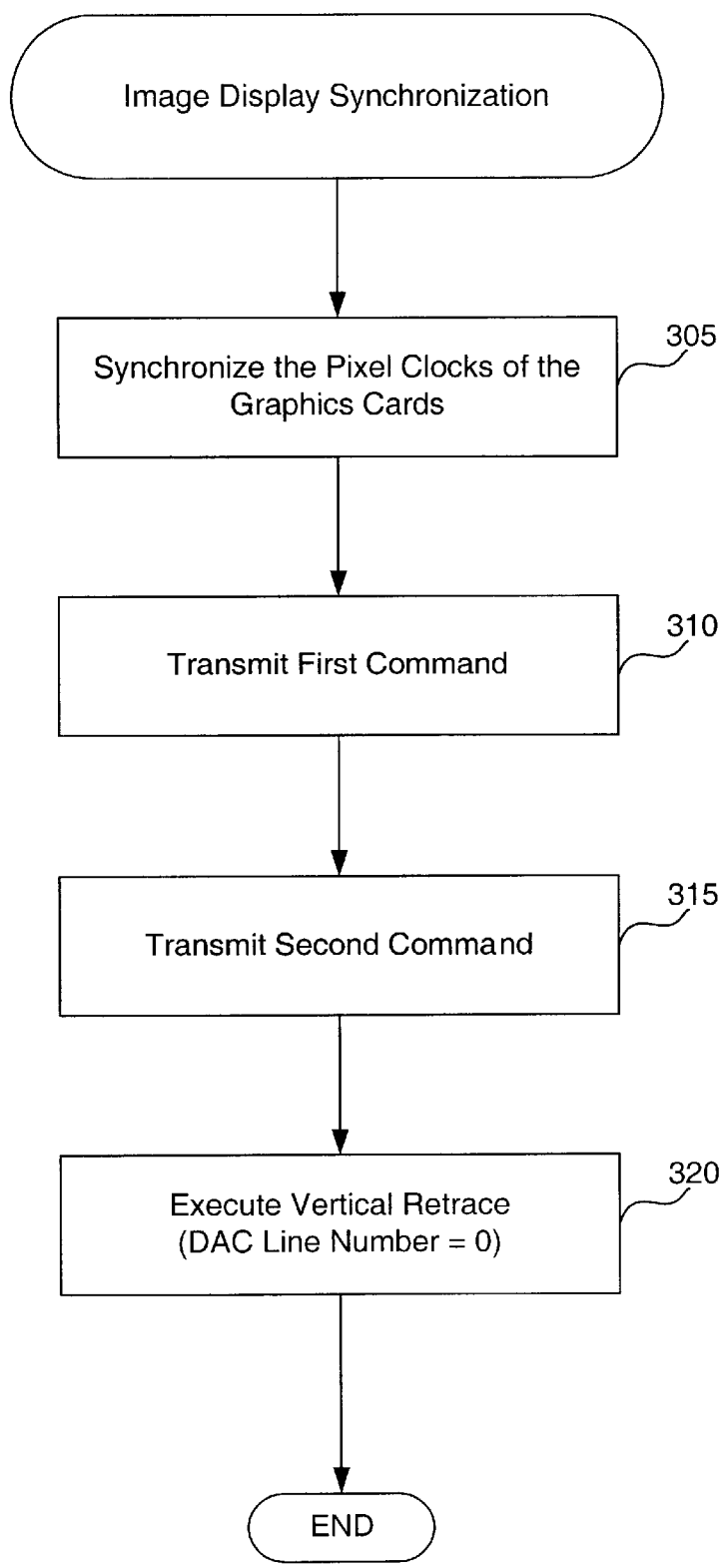
FIG. 3 is a flowchart of a method for synchronizing video display according to a preferred embodiment of the present invention.

FIG. 3 is a flowchart of a method for image display synchronization according to an embodiment of the present invention. Synchronization is used to ensure that each DAC 230 reads pixels at the same rate and from a common point as the DACS 230 of the other graphics processors 110.

In a step 305, the slave systems 105A and 105B are synchronized. Synchronization is achieved by applying a clock signal 122 from synchronization signal generator 120 to each daughter card 112A, 112B, 112C, and 112D. The clock signal 122 is subsequently provided to graphics processors 110A, 110B, 110C, and 110D through connectors 117. In one embodiment, connector 117 attaches to a clock override port (not shown) that is provided with graphics processor 108 during manufacture. However, not all commercially available graphics processors have such an override port. Therefore, in an alternate embodiment, connector 117 is a pigtail connector. In this case, the oscillator crystal (not shown) on graphics processor 110 is removed from its socket. A pigtail connector 117 is then used to connect clock signal 122 directly into the socket.

Synchronization signal generator 120 is designed to produce a clock signal at any desired rate, such that pulses are fed in a homogenous manner to each graphics processor 110 present in system 100. Once clock synchronization has been achieved, it should be apparent that the pixels will be presented by each DAC 230 at the same rate. However, to obtain complete synchronization it is also necessary to make sure that each DAC 230 starts at a common point.

Most standard VGA controls permit the DAC to be reset to allow for safe change of formats. In a multiple display environment, such as that contemplated by the present invention, it is important that upon executing vertical retrace all the systems are reset to start displaying the next frame at approximately the same position. For example, a level of acceptable variance is typically the time that it takes to display one line of data. In a 1280×1024 display presenting data at a refresh rate of 60 frames per second, one line equates to approximately 13 microseconds. The present invention allows all DAC's to be synchronized to meet this requirement.

In step 310, synchronization module 115 transmits a first command over multidrop cable 116 to the I/O port 118 located on each slave system 105. Multidrop cable 116 helps to ensure that the command is received and consequently executed by slave systems 105A and 105B to reset their respective DACS at approximately the same time. Alternatively, the first command could be passed from synchronization module 115 to slave system 105A and then to slave system 105B. This daisy chain approach is useful when the master system and slave systems are, for example, within two or three feet of one another.

This first command puts each slave system 105 into a busy or poll state, with all interrupts disabled. Once during each clock cycle, slave systems 105A and 105B will poll for a reset command.

In step 315, synchronization module 115 transmits a second command to each slave system 105. This second command is a request for each DAC 230 to perform a vertical reset. The vertical reset designates a specific line number where the vertical retrace is to begin. Typically, line zero (0) is selected. Upon receipt of the second command, in step 320, each slave system 105A and 105B causes its associated DAC 230 to reset to the specified line number. As a result, slave systems 105 are synchronized such that they begin displaying at the same rate and at a common point in the scene.

In another embodiment of the present invention, latency measurements and performance counters are used to synchronize image display. The transfer of signals between devices over serial ports or the Internet for example, is subject to transmission delays. The time differential between when a signal is transmitted and when it is received is known as latency.

Processor clocks are present in most computer processors. In some processors such as those provided by Intel Corporation, Santa Clara, Calif. or MIPS Technologies Inc., Mountain View, Calif., for example, the processor clocks are referred to as performance counters. Performance counters are incremented once during each clock cycle. Therefore, there is a direct relationship between the number of performance counter increments and a processor's cycle time.

Figure 4:
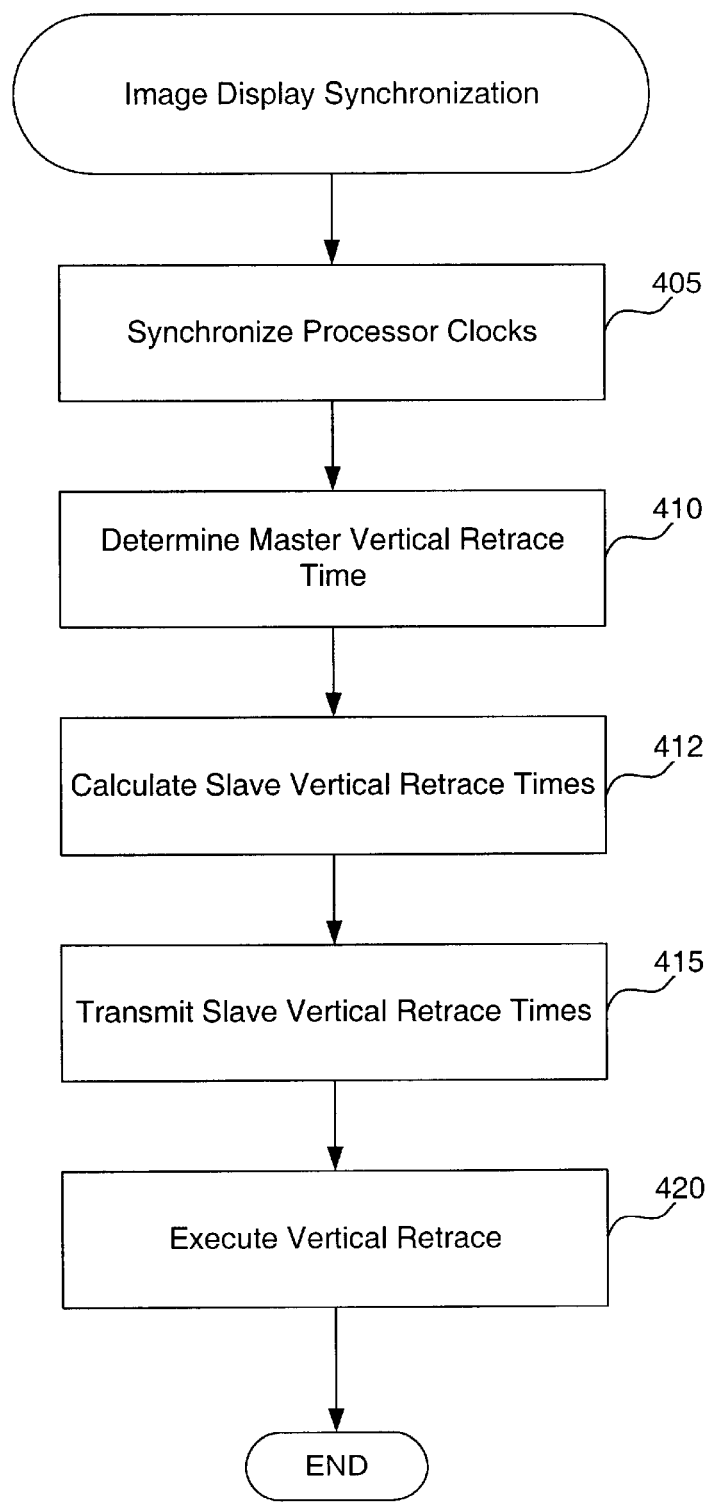
FIG. 4 is a flowchart of a method for synchronizing video display according to an alternative embodiment of the present invention.

FIG. 4 is a flowchart describing an alternative method for providing image display synchronization. In a step 405, the internal system clocks present in general purpose computers are used for synchronization. Step 405 is described with reference to FIG. 5.

Figure 5:
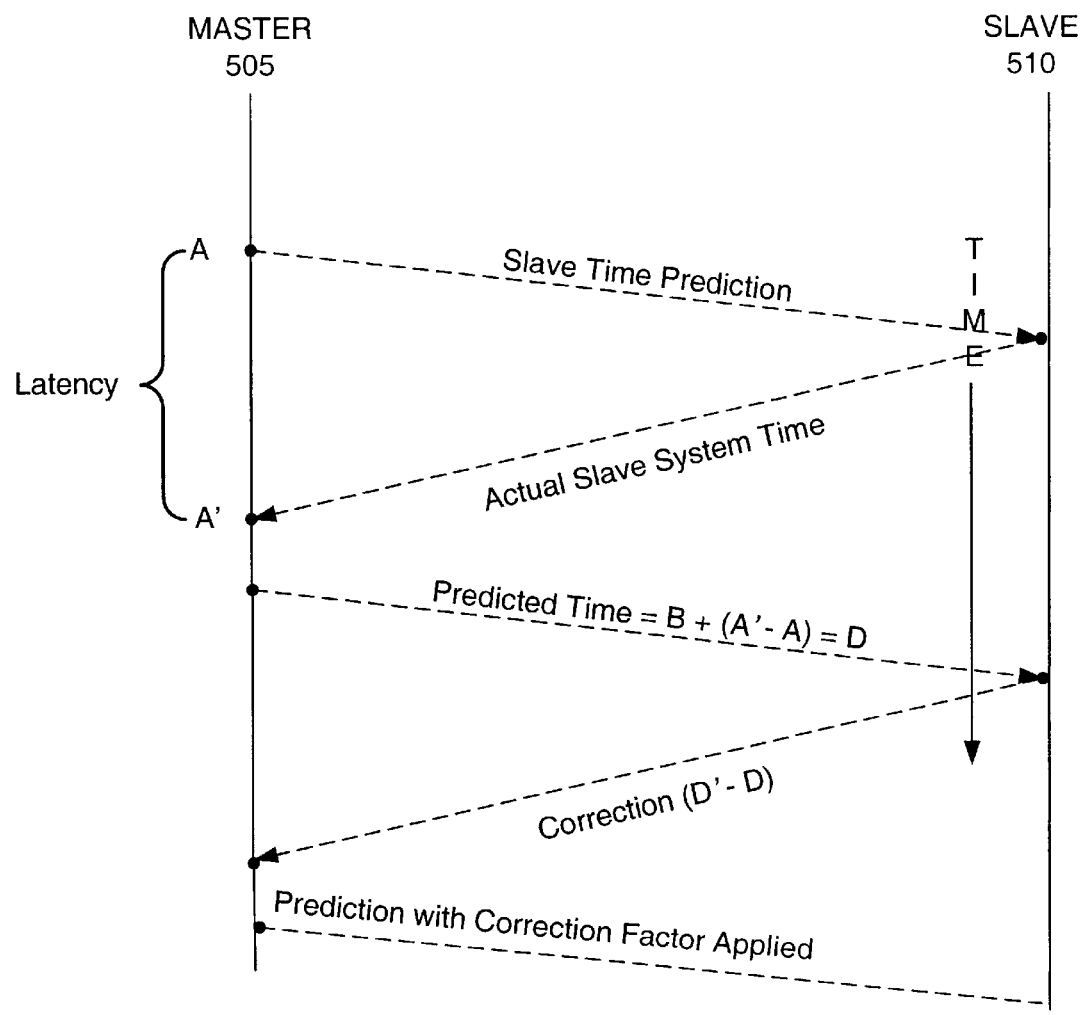
FIG. 5 is a diagram that illustrates synchronization according to an embodiment of the present invention.

FIG. 5 shows both a master system 505 and a slave system 510. A slave time prediction (A) is made by synchronization module 115. This time prediction represents the time that synchronization module 115 believes the transmitted slave time prediction will arrive at slave system 510. Upon receipt of the slave time prediction, slave system 510 returns its clock time (A') to synchronization module 115. Synchronization module 115 then determines the difference between the slave time prediction A and the actual slave system time A'. Synchronization module 115 will then make another slave time prediction (D). Slave time prediction D is obtained by adding the difference between the predicted slave time and the actual slave time (A'-A) to the current time (B) of master system 505. The slave system will again return its system time. Synchronization module 115 will continue to make time predictions and comparisons until the slave time prediction and actual slave system times are equal. Once these values are equal, synchronization module 115 is able to determine a master vertical retrace time based upon the time differential between the predicted time of receipt and actual time of receipt. For example, if the time prediction (A) is 2:32:03 and slave system 510 returns a clock time of 2:32:06 synchronization module 115 will know that its prediction is off by three seconds. In making the next prediction, synchronization module 115 will increase its approximation by three seconds to account for the time differential attributable to latency. If the returned clock time (A') equals the last prediction time sent then synchronization has been achieved. The final increment needed to make the slave prediction time and the actual prediction time equal is deemed the correction factor. The method will be further described with reference to FIG. 1 and the additional steps described in FIG. 4.

In a step 410, synchronization module 115 determines a master vertical retrace time. The master vertical retrace time indicates when the master system 107 should execute vertical retrace. In determining the master vertical retrace time, synchronization module 115 first determines the correlation between the length of a frame and master system's 107 performance counter. To do so, synchronization module 115 determines how many increments are made to master system's 107 performance counter while displaying the frame. The number of performance counter increments (typically in nanoseconds) is proportional to a processors cycle time. Thus, from the number of performance counter increments, synchronization module 115 is able to determine the time when vertical retrace occurs. Synchronization module 115 then determines the number of nanoseconds that correspond to the number of master system performance counter increments and adds this value to master system's current clock time to determine when the next vertical retrace should occur.

For example, assume the first frame being displayed takes 16 milliseconds to display and that each successive frame is expected to take the same amount of time. When display of the frame is begun, the master system's clock has the time 2:32:03 and x milliseconds. The performance counter is incremented once during display of the frame. Accordingly, the next vertical retrace can be expected to occur at 2:32:03 and x+16 milliseconds. This time becomes the master's vertical retrace time. Now, rather than waiting for an I/O interrupt to execute vertical retrace, master system 107 can simply execute a vertical retrace when its clock reaches the determined time for vertical retrace. Although the example suggests that each frame is presented one after the other without measurable time difference, it should be apparent to one skilled in the relevant art that some nanosecond periods of latency might occur.

Once the synchronization module 115 has determined the time for vertical retrace with respect to master system 107, it is ready to determine a slave vertical retrace time for slave systems 105A and 105B.

In step 412, a slave vertical retrace time for each slave system 105A and 105B is determined. This time is based upon the master system's 107 vertical retrace time and the correction factor determined in step 405. During presentation of the frame, synchronization module 115 determines a slave vertical retrace time for each slave 105A and 105B by adding the correction factor to the master's vertical retrace time determined in step 410.

For example, where the master system's 105A vertical retrace time was determined above to be 2:32:03 and x+16 milliseconds and the correction factor from step 405 was determined to be 3 seconds, slave system's 105B vertical retrace time would be 2:32:06 and x+16 milliseconds.

In a step 415, the respective slave vertical retrace times are transmitted to slave systems 105A and 105B using their respective communications cable 124A and 124B.

In a step 420, slave system 105A and slave system 105B will execute vertical retrace when their respective clocks reach the slave vertical retrace time. Since synchronization module 115 has calculated each slave system's vertical retrace time with respect to master system 107, the vertical retrace can be expected to occur at approximately the same time, despite any variation in the times of each slave's system clock.

Step 405 is repeated periodically to re-synchronize master system 107 and slave systems 105A and 105B. The determination of how frequently is dependant upon the amount of drifting or disparity observed between the slave time predictions and actual slave system times. At most, the master system 107 and slave system's 105A and 105B are re-synchronized once during each frame.

As mentioned above, synchronization of when vertical retrace occurs is only one requirement needed to be met. In addition, steps must be taken to ensure that when slave systems 105A and 105B execute vertical retrace, DACS 230 (see FIG. 2) are reset to a common point. Accordingly, when sending the slave vertical retrace times, synchronization module 115 will also designate a specific line number where the vertical retrace is to begin.

III. Synchronized Swap Ready

In a multiple processing environment, it is necessary to make sure that each slave system has its graphics processors perform buffer swapping at approximately the same time. Buffer swapping is normally performed during the time of vertical retrace just described. However, despite the close synchronization of vertical retrace among the several slave systems, steps still need to be taken to synchronize frame buffer swapping among the plurality of slave systems, else the display will be synchronized but the data displayed will be out of sync.

One approach to synchronizing swap ready maintains registers indicating the swap status of each processor in the system. The processors monitor the register for a signal indicating that all graphics processors are ready to swap. While some processors get the signal during or before vertical retrace and are able to swap immediately, others do not, and must wait until they hit the next vertical retrace before swapping. Thus, a method for determining the swap ready status of each processor before reaching vertical retrace is needed.

Figure 6:
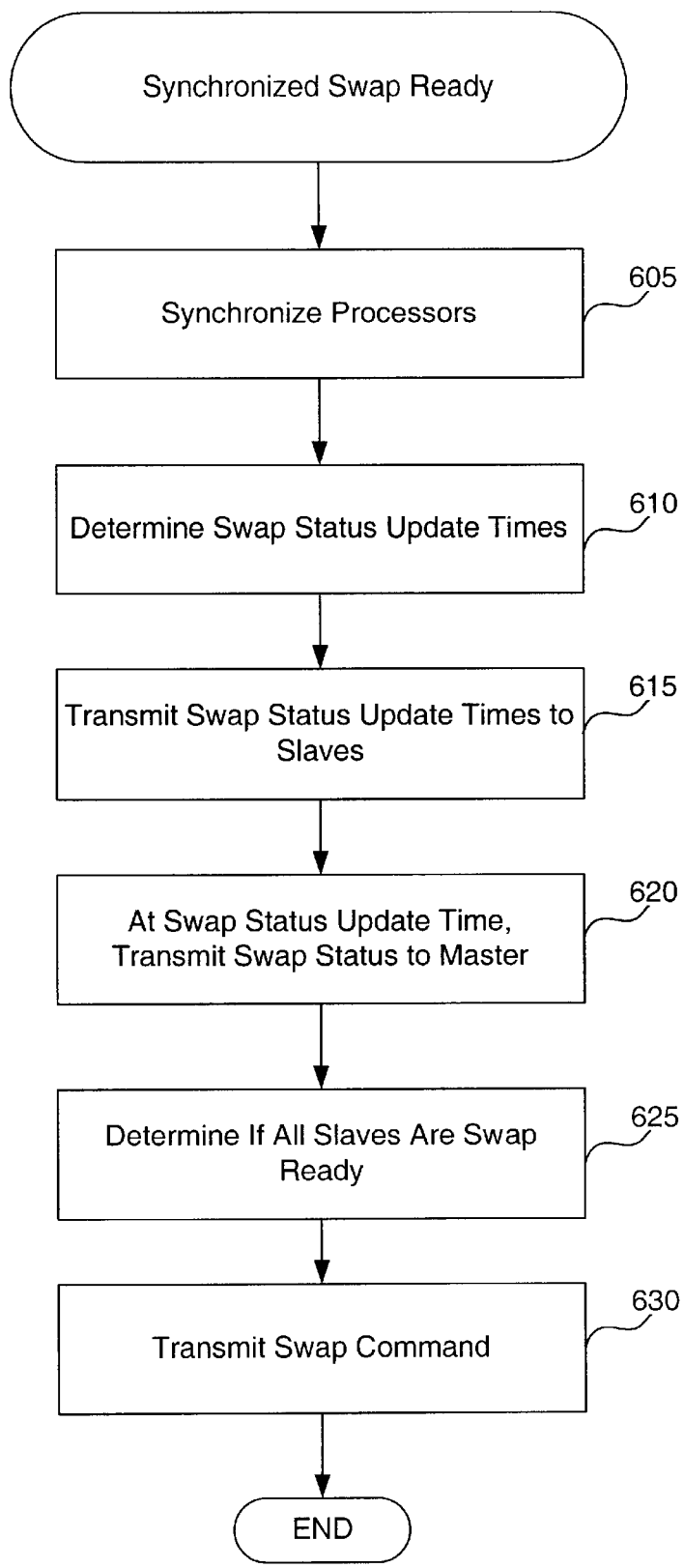
FIG. 6 is a flowchart of a method for synchronizing buffer swapping according to an embodiment of the present invention.

A method for synchronizing buffer swapping between each slave system 105A and 105B is now described with reference to FIG. 1 and the steps illustrated in FIG. 6.

In a step 605, synchronization module 115 performs clock synchronization between master system 107, slave system 105A, and slave system 105B according to the routine described above with respect to FIG. 5.

In a step 610, synchronization module 115 will determine a swap status update time for master system 107 and slave systems 105A and 105B. The swap status update time indicates when each slave system 105 needs to transmit its swap ready status to synchronization module 115. The swap status update time is determined by adding the correction factor determined in step 405, master system swap status update time, and the vertical retrace time determined in steps 405–420.

In a step 615, each slave's respective swap status update time is sent over its respective communications cable 124A and 124B. In a step 620, upon reaching the swap status update time, each slave system 105A and 105B transmits its swap status to master system 107 over its communications cable 124. The swap status will inform synchronization module 115 of whether slave system 105A and slave system 105B are ready to swap buffers. Each of the graphics processors 110 associated with slave systems 105A and 105B will eventually indicate that they are swap ready, however, device drivers 114 and 114 will withhold the instruction to swap frame buffers until the swap command is transmitted by synchronization module 115.

In a step 625, synchronization module 115 will determine when all slave systems 105 are swap ready. Once all slave systems 107 have communicated a swap status indicating that they have completed rendering and are swap ready, in a step 630, synchronization module 115 will cause master system 107 to send a broadcast swap command to each slave system 105 over multidrop cable 116. Alternatively, the broadcast swap command could be passed from the master system 107 to each slave system 105 using a daisy chain communication scheme.

Generally, swap ready status is determined by the transmission of either a high or low signal. If the signal is high then the processor has completed rendering the current buffer and is ready to switch. If the signal is low then rendering is still in progress. In a graphics system comprised of multiple graphic processors, each signal contributes to the overall status of the system. Accordingly, if any one graphics processor is not ready, then the signal transmitted will be low. Therefore, in effect, the swap command transmitted in step 630 is not transmitted until the slave system 105 processing the most complicated image has completed its rendering routine.

Figure 7:
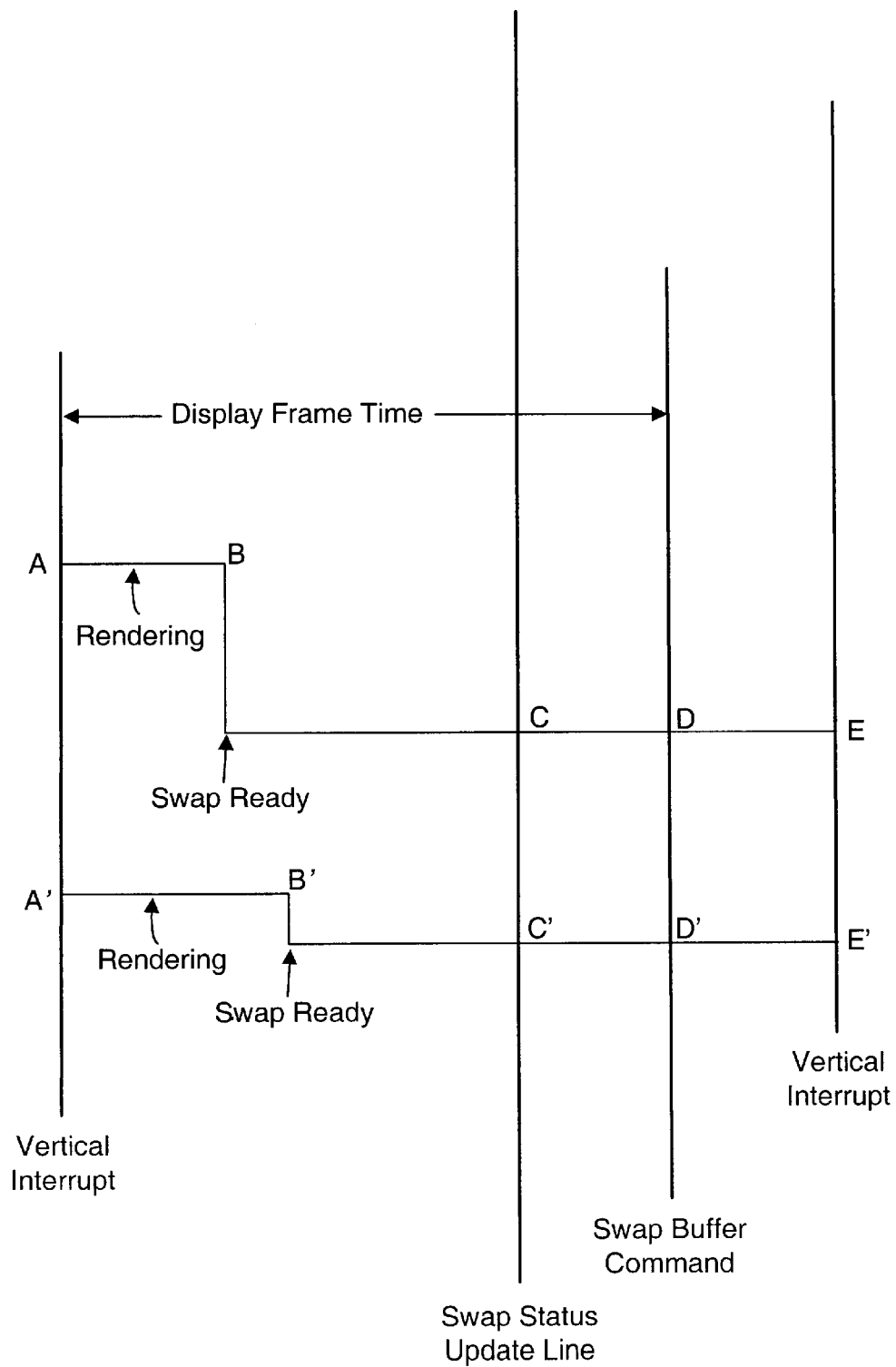
FIG. 7 is a diagram that illustrates synchronization of frame buffer swapping according to an embodiment of the present invention.

FIG. 7 provides a diagram of synchronized frame buffer swapping according to a method of the present invention. Each frame displayed in a scene is proceeded and followed by a vertical interrupt. While one frame is being displayed another is being rendered by the graphics processors. The points A and A' represent the point in which two graphics processors begin rendering a next frame. The point B represents the time when the first graphics processor completes its rendering routine. This graphics processor is now swap ready. Upon receiving a command to swap, the graphics processor will execute its frame buffer swapping routine. The second graphics processor does not become swap ready until some time later, as shown by the point B'. To ensure that both graphics processors become aware of each other's swap status in time to execute their frame buffer swap routines at approximately the same time, a swap status update time C and C' are determined. These points represent the time when each graphics processor will send its swap status to the master system. The master system is then able to transmit a swap buffer command which is received by the graphics processors as represented by points D and D'. Each processor will then execute a frame buffer swap during the next vertical interrupt it encounters. The next vertical interrupt occurs at the points labeled E and E' which because of vertical retrace synchronization, can be expected to occur at approximately the same time.

IV. Conclusion

Various embodiments of the present invention have been described above. It should be understood that these embodiments have been presented by way of example only, and not limitation. It will be understood by those skilled in the relevant art that various changes in form and detail of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A graphics system for generating synchronized images comprising:
    a plurality of slave processors;
    a master processor for synchronizing generation of a common scene by said plurality of slave processors;
    a synchronization module associated with said master processor, wherein said synchronization module generates a time synchronization signal and an interrupt signal that suspends operation of each of said plurality of slave processors when a command is to be sent to reset each of said plurality of slave processors to start display of a next frame at approximately the same position;
    a plurality of device drivers for exchanging synchronization commands between said master processor and said plurality of slave processors, each device driver being associated with one of said plurality of slave processors;
    a timing signal provider for propagating a time synchronization signal to said plurality of slave processors from a synchronization signal generator associated with said master processor;
    at least one graphics processor associated with each slave processor for producing pixels in synchronization with the time synchronization signal; and
    a communications link connecting said master processor to each of said plurality of slave processors to provide simultaneous communication of a synchronization command to each of said plurality of slave processors.

2. The graphics system of claim 1, wherein said time synchronization signal is a pulse stream signal.

3. The graphics system of claim 2, wherein said pulse stream signal is a clock signal.

4. The graphics system of claim 2, wherein said pulse stream signal is a video signal.

5. The graphics system of claim 1, further comprising a connector for transmitting an electrical signal between said timing signal provider and said at least one graphics processor associated with each slave processor.

6. The graphics system of claim 5, wherein said timing signal provider is an integrated circuit board.

7. The graphics system of claim 5, wherein said timing signal provider is a fanout box having signal amplifiers.

8. The graphics system of claim 1, wherein said communications link is a multidrop cable.

9. The graphics system of claim 1, wherein said communications link is a daisy chain.

10. A method for image display synchronization, the method comprising the steps of:
    (a) providing a time synchronization signal to each of a plurality of slave processors so that a plurality of graphics processors associated with said slave processors display pixels at approximately the same rate,
    (b) issuing a first command from a master processor to said plurality of slave processors to disable interrupts to said plurality of graphics processors;
    (c) polling by each of said plurality of slave processors for a second command to cause each of slave processors to execute a vertical retrace at a specified line; and
    (d) issuing the second command from said master processor to said plurality of slave processors to cause each of said slave processors to execute vertical retrace at a specified line.

11. The method of claim 10, wherein said first and second commands are transmitted in a daisy-chained manner from slave processor to slave processor among the said plurality of slave processors.

12. The method of claim 11, further comprising the step of receiving said second command at each of said plurality of slave processors and, in response, resetting a digital to analog converter within each of said plurality of graphics processors to said specified line.

13. A graphics system for generating synchronized images comprising:
    a plurality of slave processors;
    a master processor for synchronizing generation of a common scene by said plurality of slave processors, wherein said master processor and at least one of said plurality of slave processors are located at multiple locations;
    a synchronization module associated with said master processor, wherein said synchronization module generates a time synchronization signal and an interrupt signal that suspends operation of each of said plurality of slave processors when a command is to be sent to reset each of said plurality of slave processors to start display of a next frame at approximately the same position;

a plurality of device drivers for exchanging synchronization commands between said master processor and said plurality of slave processors, each device driver being associated with one of said plurality of slave processors;

a timing signal provider for propagating a time synchronization signal to said plurality of slave processors from a synchronization signal generator associated with said master processor;

at least one graphics processor associated with each slave processor for producing pixels in synchronization with the time synchronization signal; and a communications link connecting said master processor to each of said plurality of slave processors to provide simultaneous communication of a synchronization command to each of said plurality of slave processors.

14. A graphics system for generating synchronized images comprising:

a plurality of slave processors;

a master processor for synchronizing generation of a common scene by said plurality of slave processors, wherein said master processor and at least one of said plurality of slave processors are located at multiple locations;

a synchronization module associated with said master processor, wherein said synchronization module generates a time synchronization signal and an interrupt signal that suspends operation of each of said plurality of slave processors when a command is to be sent to reset each of said plurality of slave processors to start display of a next frame at approximately the same position, wherein said synchronization module provides timing adjustments that account for transmission delays of signals between said master processor and said plurality of slave processors;

a plurality of device drivers for exchanging synchronization commands between said master processor and said plurality of slave processors, each device driver being associated with one of said plurality of slave processors;

a timing signal provider for propagating a time synchronization signal to said plurality of slave processors from a synchronization signal generator associated with said master processor;

at least one graphics processor associated with each slave processor for producing pixels in synchronization with the time synchronization signal;

a communications link connecting said master processor to each of said plurality of slave processors to provide simultaneous communication of a synchronization command to each of said plurality of slave processors;

a plurality of display devices, wherein each of said plurality of display devices is coupled to a corresponding graphics processor among said at least one graphics processor.

15. The graphics system of claim 14, wherein said plurality of display devices are coupled through an Internet.

16. The graphics system of claim 14, wherein said plurality of slave processors are coupled through an Internet.

17. A method of image display synchronization, the method comprising the steps of:

(a) providing a time synchronization signal to each of a plurality of slave processors so that a plurality of graphics processors associated with said slave processors display pixels at approximately the same rate, (b) issuing a first command from a master processor to said plurality of slave processors to disable interrupts to said plurality of graphics processors;

(c) polling by each of said plurality of slave processors for a second command to cause each of slave processors to execute a vertical retrace at a specified line; and (d) issuing a second command from said master processor to said plurality of slave processors to cause each of said slave processors to execute vertical retrace at a specified line; and (e) synchronizing the display of images on multiple displays based on the time synchronization signal.

18. The method of claim 17, wherein step (a), providing a time synchronization signal occurs over an Internet.

* * * * *